(12) United States Patent
Su et al.

(10) Patent No.: US 8,630,509 B2
(45) Date of Patent: Jan. 14, 2014

(54) STRUCTURED GRIDS FOR LABEL PROPAGATION ON A FINITE NUMBER OF LAYERS

(75) Inventors: Bor-Yiing Su, Albany, CA (US); Tasneem G. Brutch, Lincoln, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 797 days.

(21) Appl. No.: 12/686,999

(22) Filed: Jan. 13, 2010

(65) Prior Publication Data

US 2011/0103711 A1 May 5, 2011

Related U.S. Application Data

(60) Provisional application No. 61/257,736, filed on Nov. 3, 2009.

(51) Int. Cl.
*G06K 9/36* (2006.01)

(52) U.S. Cl.
USPC ............ 382/276; 348/162; 358/1.9; 370/235; 375/240.08; 382/159; 382/165; 382/173; 382/180; 382/253; 382/305; 707/713; 718/1

(58) Field of Classification Search
None
See application file for complete search history.

(56) References Cited

U.S. PATENT DOCUMENTS

| | | | | |
|---|---|---|---|---|
| 7,227,893 B1 * | 6/2007 | Srinivasa et al. | ......... | 375/240.08 |
| 7,428,331 B2 * | 9/2008 | Bhattacharjya | ............... | 382/165 |
| 7,444,019 B2 * | 10/2008 | Boykov et al. | ................ | 382/173 |
| 7,536,064 B2 * | 5/2009 | Venkatesan et al. | .......... | 382/305 |
| 7,689,038 B2 * | 3/2010 | Zahniser | ........................ | 382/180 |
| 7,864,365 B2 * | 1/2011 | Campbell et al. | .............. | 358/1.9 |
| 7,881,532 B2 * | 2/2011 | Zahniser | ........................ | 382/180 |
| 7,969,884 B1 * | 6/2011 | Venables et al. | ............... | 370/235 |
| 2003/0077001 A1 * | 4/2003 | Yamashita et al. | ............. | 382/276 |
| 2005/0213837 A1 * | 9/2005 | Boykov et al. | ................ | 382/253 |
| 2007/0291120 A1 * | 12/2007 | Campbell et al. | .............. | 348/162 |
| 2007/0291288 A1 * | 12/2007 | Campbell et al. | .............. | 358/1.9 |
| 2008/0019587 A1 * | 1/2008 | Wilensky et al. | .............. | 382/159 |
| 2010/0191716 A1 * | 7/2010 | Chen et al. | .................... | 707/713 |
| 2010/0192148 A1 * | 7/2010 | Chen et al. | ......................... | 718/1 |
| 2011/0096993 A1 * | 4/2011 | Campbell et al. | .............. | 382/180 |
| 2011/0103712 A1 | 5/2011 | Su et al. | | |

OTHER PUBLICATIONS

Meijster, A. and Roerdink, J. B., "*A proposal for the implementation of a parallel watershed algorithm*," Computer Analysis of Images and Patterns, V. Hlavac and R. Sara, Eds.New York—Heidelberg—Berlin, 790-795, 1995.

(Continued)

*Primary Examiner* — Tsung-Yin Tsai
(74) *Attorney, Agent, or Firm* — Kenneth L. Sherman, Esq.; Michael Zarrabian, Esq.; Sherman & Zarrabian LLP

(57) ABSTRACT

An image represented by multiple nodes can be processed by determining whether labels can be propagated to a node from another node of the image. Conceptually, an image can be presented as a "structured grid" of multiple nodes (e.g., a structured grid of pixels of an image). In a "structured grid," two or more nodes of the same level (e.g., nodes in the same gray level) can determine in parallel whether to propagate a label from one or more of its neighboring nodes that are labeled and propagate one or more labels accordingly. An image can be processed by iteratively repeating this process for nodes of successive levels. It will be appreciated that the disclosed techniques allow parallelism without requiring partitioning of an image or having to merge partitioned images. The disclosed techniques are especially suited for watershed algorithms.

21 Claims, 13 Drawing Sheets

(56) References Cited

OTHER PUBLICATIONS

Moga, A. N., and Gabbouj, M., "*Parallel Image Component Labeling With Watershed Transformation*," IEEE Transactions on Pattern Analysis and Machine Intelligence, vol. 19, No. 5, 441-450, 1997.

Bieniek, A., Burkhardt, H., Marschner, H., Nolle, M., and Schreiber, G., "*A Parallel Watershed Algorithm*," Technical Report. UMI Order No. TR-402-96-006., Universitaet Hamburg, 1996.

H. Zhou, Y. Jiang, X. Yang, "*An Improved Parallel Watershed Algorithm for Distributed Memory System*," Fifth International Conference on Algorithms and Architectures for Parallel Processing (ICA3PP'02), 310-313, 2002.

Meyer, F., "Topographic Distance and Watershed Lines", Signal Processing, Jul. 1994, pp. 113-125, vol. 38, No. 1, Elsebier North-Holland, Inc., Amsterdam, The Netherlands.

An, P. et al., "STAPL: An Adaptive, Generic Parallel C++ Library", Proceedings of the 14th International Workshop on Languages and Compilers for Parallel Computing (LCPC '01), Aug. 2001, pp. 193-208, vol. 2624, Springer Berlin Heidelberg, Germany.

Heilscher, F. et al., "ParGraph", http://pargraph.sourceforge.net/, Oct. 2004, p. 1, Sourceforge.net, USA.

Gregor, D. et al., "The Parallel BGL: A Generic Library for Distributed Graph Computations", Proceedings of the 2005 Parallel Object-Oriented Scientific Computing (POOSC '05), Jul. 2005, pp. 1-18, vol. 14, No. 2, IOS Press Amsterdam, The Netherlands.

Intel Corporation, "Intel® Cilk™ Plus | Intel® Developer Zone", http://software.intel.com/en-us/intel-cilk-plus, downloaded Feb. 28, 2013, pp. 1-2, Intel Corporation, USA.

Leiserson, C.E. et al., "Introduction to Cilk++ Programming", PowerPoint Presentation, Jul. 2009, slides 1-60, Charles E. Leiserson and Pablo Halpern, USA.

U.S. Non-Final Office Action for U.S. Appl. No. 12/687,013 mailed Nov. 30, 2012.

U.S. Final Office Action for U.S. Appl. No. 12/687,013 mailed Apr. 2, 2013.

* cited by examiner

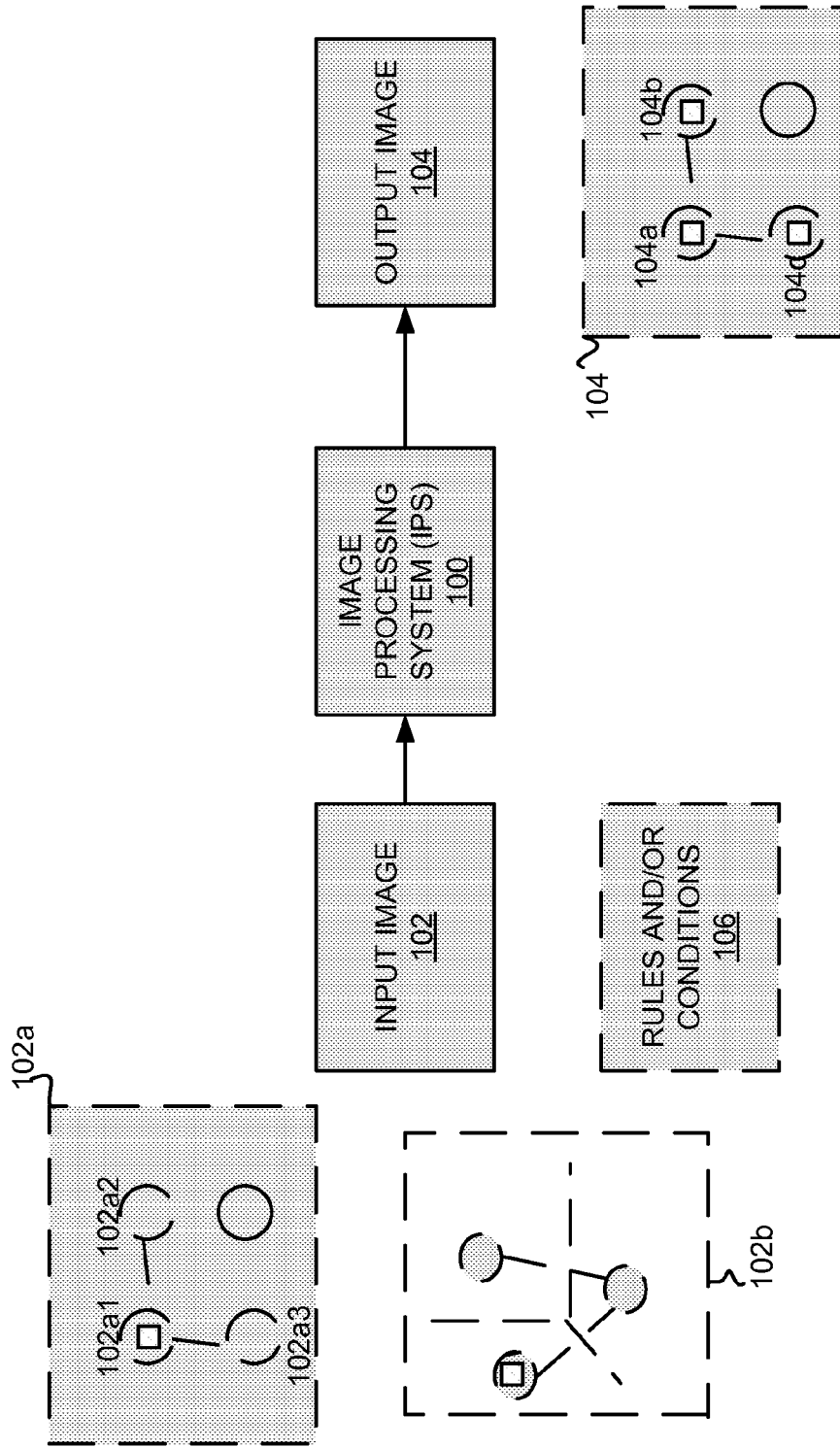

Previous Stage          Current Stage

Fig. 4C

STRUCTURED GRIDS FOR LABEL PROPAGATION ON A FINITE NUMBER OF LAYERS

CROSS REFERENCE TO RELATED APPLICATIONS

This application claims the benefit of priority under 35 U.S.C. §119(e) to U.S. Provisional Patent Application No. 61/257,736, by SU et al., filed on Nov. 3, 2009, entitled "IMAGE PROCESSING TECHNIQUES USING STRUCTURED GRIDS." In addition, this application is related to U.S. patent application Ser. No. 12/687,013, by SU et al., entitled "STRUCTURED GRIDS AND GRAPH TRAVERSAL FOR IMAGE PROCESSING." All of the foregoing applications are hereby incorporated herein by reference in their entirety and for all purposes.

BACKGROUND

Conceptually, a computing system (e.g., a computing device, a personal computer, a laptop, a Smartphone, a mobile phone) can accept information (content or data) and manipulate it to obtain or determine a result based on a sequence of instructions (or a computer program) effectively describing how to process the information. Typically, the information is stored in a computer readable medium in a binary form. More complex computing systems can store content including the computer program itself. A computer program may be invariable and/or built into, for example, a computer (or computing) device as logic circuitry provided on microprocessors or computer chips. Today, general purpose computers can have both kinds of programming. Storing content (or information retention) is of one the core functions of computing devices. Today, numerous types of computing devices are available. These computing devices widely range with respect to size, cost, amount of storage and processing power. The computing devices that are available today include: expensive and powerful servers, relatively cheaper Personal Computers (PC's) and laptops, and yet less expensive microprocessors (or computer chips) provided in storage devices, automobiles, and household electronic appliances. Memory and storage devices have long been an important part of computing and computing devices. Memory and storage device technology have been markedly improved in recent years. Today, relatively large amounts of content can be stored in portable and easy to access devices such as USB flash drives (or USB flash devices). The content stored on USB flash drives can be easily carried and copied on to various computing devices. By way of example, data stored on a server computer can be copied on to a USB flash drive and taken home and loaded (or copied) on to a Personal Computer (PC).

Among other things, computing systems can be used for image processing. Generally, image processing can be any form of signal processing where the input is an image (e.g., photographs, frames of video). The output of image processing can also be an image or a set of characteristics or parameters related to the image. Image processing techniques can involve treating the input image as a two-dimensional signal and applying standard signal-processing techniques to it. Image processing techniques can also be used to process a 3-D image. An image can be represented as a graph which can be "traversed" in order to process the image. During graph traversal, information can be propagated between the nodes of the graph.

Often, image processing refers to digital image processing as the use of computer (or computer-based) algorithms to process digital images. As a subfield of digital signal processing, digital image processing has many advantages over analog image processing, as it allows a wider range of algorithms to be applied to the input, as well as avoiding various problems associated with analog image processing (e.g., buildup of noise, signal distortion during processing).

Digital image processing is widely recognized by the scientific community and used by those in the general public accustomed to digital cameras, digital image editing, and the like. As such, digital image processing techniques are very useful as evidenced by their use in various forms and in many different applications. Digital imaging can be realized or achieved using a computing system (e.g., a computer). For example, a computer can execute (or run) an executable computer program to recognize objects in various digital images stored in a database.

In digital image processing, an image (I) can be represented by a graph "G=(V, E)" where "V" represents a set of nodes and "E" represents the edges of the graph. In the graph "G=(V, E)" each vertex v is a subset of nodes (V) (v∈V) that can, for example, represent a pixel of the image (I) or a set of pixels in the image (I). The edges (E) can represent the relationship between the pixels or pixel groups. By way of example, the image (I) can be represented by performing the following operations: (i) for each pixel in the image (I), use a vertex to represent a pixel, (ii) for each pixel vertex, connect it with its north, south, east, and west neighboring pixel vertices by edges. The result is a connected graph representing the image (I) with neighboring relationships of its pixels. Similarly, a 3D image can be also represented by a graph with v∈V representing a voxel or a set of voxels with a set of edges (E) representing the relationship between the voxels or voxel groups. Given a graph G=(V, E) and a set of source vertices (S) as a subset of the nodes (V) (S ⊂ V) "graph traversal" can refer to "walking" from the source vertices (S) to other vertices following the edges (E) of the graph until a termination criterion is satisfied (e.g., all the vertices in V have been visited).

A Breadth First Search (BFS) graph traversal algorithm can be defined as follows. Let u and v be two vertices in the graph "G=(V, E)," u and v are neighbors if and only if there exists an edge connecting vertex u and vertex v. For a vertex u, let "N(u)" be the set of neighboring nodes of u. For a set of vertices U, let $$"N(U) = \bigcup_{u \in U} N(u)".$$

Given a graph "G=(V, E)" and a set of source vertices S ⊂ V, a BFS graph traversal algorithm can be performed by traversing the graph iteratively, such that for the first iteration, all vertices in "N(S)" are visited and for the second iteration "N(N(S))" is visited, and for the third iteration "N(N(N(S)))" is visited, and so on. It should be noted that a graph "G=(V, E)" can be used by other image processing techniques, such as, for example, "watershed" algorithms that propagate labels on a number of finite numbers of layers in order to detect boundaries as generally known in the art.

Digital image processing can require many computations. As such, digital image processing can be a computationally intensive process. Object recognition, which generally requires graph traversal, is an example of a digital imaging process that can be very computationally intensive. As a key technique for analyzing images, object recognition, among other things, can be used to classify objects in digital images.

The digital images can, for example, be stored in a database. However, more accurate object recognition techniques are relatively more computationally intensive, as is generally known in the art.

Given that digital imaging is widely used for numerous applications today, alternative techniques for image processing would be useful.

SUMMARY

Broadly speaking, the invention relates to image processing for computing environments and computing systems. More particularly, the invention pertains to "structured grids" computations for propagating labels in a finite number of layers in order to process an image.

"Structured grids" can be provided as mechanism to arrange data in a regular multidimensional grid (mostly 2D or 3D) whereby computation can proceed by updating a number of grids structured to represent an image according to the information obtained from neighboring grids. Generally, each grid can be updated synchronously or asynchronously. If the grids are updated synchronously, the computation can, for example update all of the grids iteratively. If the grids are updated asynchronously, each grid can, for example, update itself if any of its neighbors are updated.

A wide variety of approaches can be taken to map structured grids computations in parallel, for example, on multi-core computing systems. For example, grids can be divided by columns, by rows, or by regular chunks. Another possibility is to use "multi-grid refinement." For multi-grid modeling, instead of partitioning the data into fixed sized chunks, several copies of the grids are made at various chunk granularities. Coarse-grained chunks can be used to make the more distant updates while the fine-grained chunks can make the detailed propagation.

Typically, an image has a "regular" data arrangement and the graph representation of the image therefore has also a regular data arrangement suitable for a structured grid computations. As such, structured grids computation, among other things, can be used for graph traversal. Given a regular graph representation of an image, each vertex in the graph can be modeled by a grid, or a regular chunk of vertices can be modeled by a grid. The traversal behavior from source vertices to neighboring nodes can be simulated by updating the grid information. However, it should be noted that the computation order can be the reversed. That is, in conventional graph traversal, each source vertex traverses its neighboring vertices directly. In stark contrast, in structured grids computation, each grid can check if it can be updated by a neighboring source grid.

It will be appreciated that the disclosed image processing techniques, among other things, can achieve significantly greater parallelism and scalability than that which can be achieved using conventional techniques. In particular, image processing techniques requiring propagation of labels between nodes of an image (e.g., a watershed algorithm) can significantly benefit from the disclosed image processing techniques. As is generally known in the art, an image can be represented by a numbers of nodes (e.g., nodes in a graph). The image can be processed in multiple stages or iterations. During a first stage of image processing, a label from a labeled node (e.g., a source node) can be propagated to one or more other nodes that are typically unlabeled (hereinafter referred to as one or more "neighboring nodes"). At a succeeding stage, the label can be propagated from a neighboring node to its neighboring nodes, and so on. It should be noted that solely for the sake of clarity, any node with a label (or including a label) that can be propagated to a first node is referred to herein as a "neighboring node" of the first node. However, it should be noted that a "neighboring node" need not necessarily be an adjacent node or even a node physically neighboring or regionally adjacent, since any node that includes information that can be effectively propagated to another node in accordance with an image processing algorithm is considered to be a "neighboring node." It should be noted that in image processing techniques that propagating labels, nodes of an image can be associated with values, for example, each node can be assigned a value representative of a level between level zero (0) and level two hundred and fifty five (255). The assigned values can be considered in determining whether to propagate a label, as will be appreciated by those skilled in the art. An image can be represented by structured grids for image processing. By way of example, an image can be represented as a graph with a regular structure, where each pixel of the image is a node in the graph. For example, a graph can be divided into a number of rectangles of the same size, with each rectangle being a group of pixels of the same color.

In accordance with one aspect of the invention, an image represented by multiple nodes can be processed by determining whether a label can be propagated to a node from another node of the image. In other words, a node of the image can determine whether a label can be propagated to it from one or more other nodes (e.g., its neighboring nodes) that are labeled, instead of a labeled node determining whether it can propagate its labels to its neighboring node(s). It will be appreciated that this approach allows significantly greater parallelism and scalability. As a result, image processing which is typically a highly intensive computing process can be performed more quickly or more efficiently especially by taking advantage of multiprocessing or multi-core processors that are prevalent and widely available today.

Conceptually, an image can be presented as a "structured grid" of multiple nodes for propagation of labels between the nodes of an image in accordance with another aspect of the invention (e.g., a structured grid of pixels of an image). As will be appreciated by those skilled in the art, in a "structured grid," two or more of the nodes can perform operations relating to propagation of labels in parallel (or substantially or effectively at the same time). In fact, multiple nodes of the same level can perform operations relating to propagation of labels in parallel. For example, at a given stage of image processing, each one of multiple unlabeled nodes in the same level can determine whether to propagate a label from one or more neighboring nodes. This means that each of the nodes of a gray scale can perform operations associated with the propagating of labels in parallel, thereby allowing for a greater degree of parallelism to be achieved. It will also be appreciated that a "structured grid" allows parallelism without requiring partitioning of an image or merging partitions of an image in order to propagate labels. An image can be processed by iteratively processing the nodes of a succeeding level (or a next-level), as will be appreciated by those skilled in the art.

As an exemplary method for processing an image represented by multiple nodes, by propagating labels between one or more of the nodes, one embodiment of the invention can include the acts of: (a) obtaining labeled nodes of the image, a Low-Value, and a High-Value, (b) determining if there is at least one unlabeled Next-Value node, (c) for each unlabeled Next-Value node, determining if there is at least one labeled neighboring node; (d) for each unlabeled Next-Value node, propagating one or more labels from its one or more labeled neighboring nodes; and (e) incrementally repeating (b), (c) and (d) for succeeding Next-Values until the High-Value is reached. It should be noted that at least the determining (c) of whether there is at least one labeled neighboring node and/or the propagating (d) of one or more labels can be performed in parallel for two or more of the unlabeled Next-Value nodes, in accordance with another embodiment of the invention. As another example, a computing system (e.g., a computing device) can be operable to perform the image processing method noted above. As yet another example, a computer readable (storage) medium can store executable code that when executed causes a computing system to perform the image processing method noted above.

BRIEF DESCRIPTION OF THE DRAWINGS

The present invention will be readily understood by the following detailed description in conjunction with the accompanying drawings, wherein like reference numerals designate like structural elements, and in which:

FIG. 1 depicts an Image Processing System (IPS) in accordance with one embodiment of the invention.

FIG. 4C depicts a representation of a structured grid in accordance with one embodiment of the invention.

DETAILED DESCRIPTION

Figure 2A:
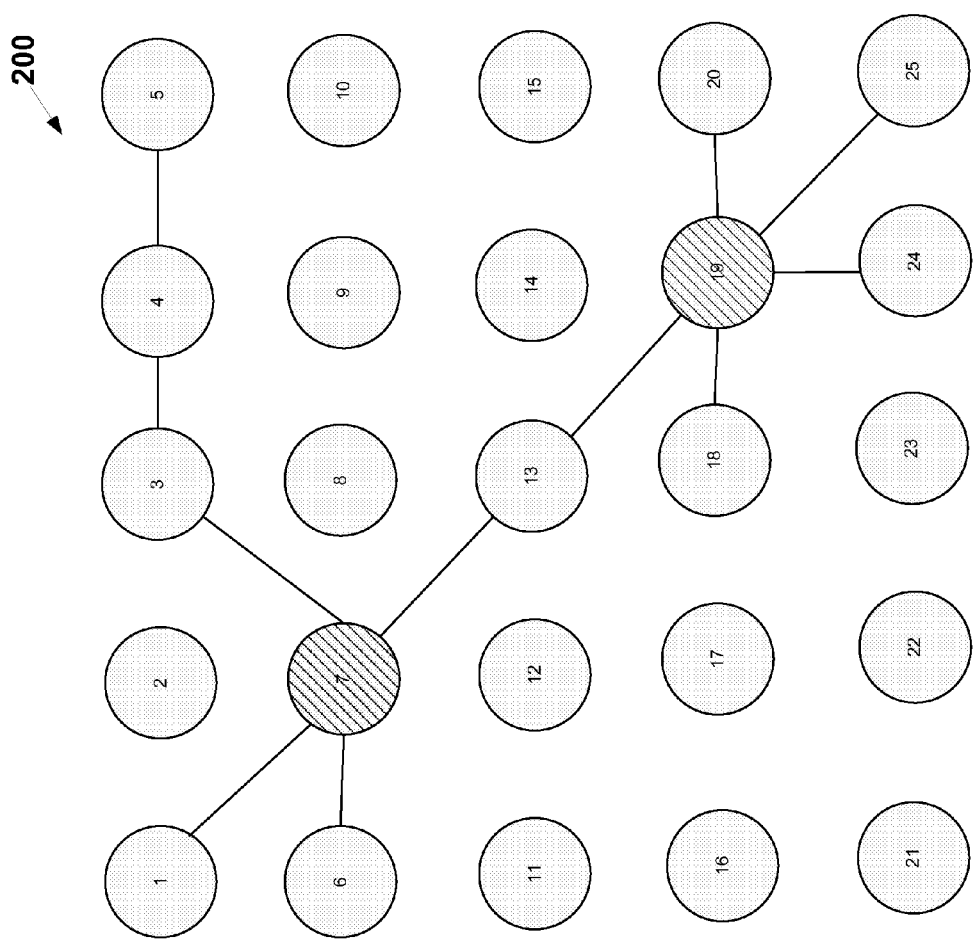
FIG. 2A depicts a portion of an exemplary two-dimensional (2D) graph suitable for processing by an IPS in accordance with one embodiment of the invention.

As noted in the background section, digital imaging is widely used for numerous applications in various computing environments and systems. As such, image processing techniques are generally useful.

It will be appreciated that the invention pertains to image processing techniques for processing images in computing environments and/or computing systems. Moreover, the disclosed image processing techniques, among other things, can achieve significantly greater parallelism and scalability than that which can be achieved using conventional techniques. In particular, image processing techniques requiring propagation of labels between nodes of an image (e.g., a watershed or watershed algorithm) can significantly benefit from the disclosed image processing techniques. As is generally known in the art, an image can be represented by a number of nodes (e.g., nodes in a graph). The image can be processed in multiple stages or iterations. During a first stage of image processing, a label from a labeled node (e.g., a source node) can be propagated to one or more other nodes that are typically unlabeled (hereinafter referred to as one or more "neighboring nodes"). At a succeeding stage, the label can be propagated from a neighboring node to its neighboring nodes, and so on. It should be noted that solely for the sake of clarity, any node with a label (or including a label) that can be propagated to a first node is referred to herein as a "neighboring node" of the first node. However, it should noted that a "neighboring node" need not necessarily be an adjacent node or even a node physically neighboring or regionally adjacent, since any node that includes information that can be effectively propagated to another node in accordance with an image processing algorithm is considered to be a "neighboring node." It should be noted that in image processing techniques that propagate labels, nodes of an image can be associated values. For example, each node can be assigned a value between zero (0) and two hundred and fifty five (255). The assigned values can be considered in determining whether to propagate a label, as will be appreciated by those skilled in the art.

In accordance with one aspect of the invention, an image represented by multiple nodes can be processed by determining whether a label can be propagated to a node from another node of the image. In other words, a node of the image can determine whether a label can be propagated to it from one or more other nodes (e.g., its neighboring nodes) that are labeled, instead of a labeled node determining whether it can propagate its labels to its neighboring node(s). It will be appreciated that this approach allows significantly greater parallelism and scalability. As a result, image processing which is typically a highly intensive computing process, can be performed more quickly or more efficiently especially by taking advantage of multiprocessing or multi-core processors that are prevalent and widely available today.

Conceptually, an image can be presented as a "structured grid" of multiple nodes for propagation of labels between the nodes of an image, in accordance with another aspect of the invention (e.g., a structured grid of pixels of an image). As will be appreciated by those skilled in the art, in a "structured grid," two or more of the nodes can perform operations relating to propagation of labels in parallel (or substantially or effectively at the same time). In fact, multiple nodes of the same level can perform operations relating to propagation of labels in parallel. For example, at a given stage of image processing, each one of multiple unlabeled nodes in the same level can determine whether to propagate a label from one or more neighboring nodes. This means that each of the nodes of a gray scale can perform operations associated with propagating of labels in parallel, thereby allowing for a greater degree of parallelism to be achieved. It will also be appreciated that a "structured grid" allows parallelism without requiring partitioning of an image or merging partitions of an image in order to propagate labels. An image can be processed by iteratively processing the nodes of a succeeding level (or a next-level), as will be appreciated by those skilled in the art.

An image can be represented by structured grids for image processing. By way of example, an image can be represented as a graph with a regular structure, where each pixel of the image is a node in the graph. For example, a graph can be divided into a number of rectangles of the same size, with each rectangle being a group of pixels of the same color.

Embodiments of these aspects of the invention are discussed below with reference to FIGS. 1-7B. However, those skilled in the art will readily appreciate that the detailed description given herein with respect to these figures is for explanatory purposes, as the invention extends beyond these limited embodiments.

FIG. 1 depicts an Image Processing System (IPS) 100 in accordance with one embodiment of the invention. IPS 100 can be, for example, be provided as a computing system (e.g., a computer) operable to execute executable computer code. As such, as a computing system, IPS 100 can include one or more processors or processing cores ("cores), and memory including volatile and non-volatile memory (not shown) as will be readily appreciated by those skilled in the art.

Referring to FIG. 1, IPS 100 can receive (or be operable to receive) input data (or input image) 102 and process it to provide output data (or output image) 104. Generally, data, including input data 102 and output data 104 can be stored in a computer readable storage medium (e.g., memory, a hard disk) as known in the art. The input data 102 can be representative of an image to be processed (or an input image 102) and the output data 104 can be representative of the processed data (or output image 104). The input image 102 being processed can, for example, be a two-dimensional (2D) or three-dimensional (3D) digital image as generally known in the art. Typically, the input data 102 is representative of an image that includes (or is being represented by) multiple node. The nodes can, for example, be part of a graph in a 2D or 3D space, such as, 2D and 3D graphs depicted by the exemplary input data 102*a* and 102*b* in FIG. 1.

More specifically, IPS 100 can be operable to effectively process an input image (represented by the input data 102) by propagating information between one or more nodes of the input image. As will be appreciated by those skilled in the art, information can be propagated between the nodes, for example, in accordance with one or more rules and/or when one or more conditions are made. As such, rules and/or conditions data 106 can also be provided as input and received by the IPS 100. In other words, the IPS 100 can be operable to process the input image 102 represented by multiple nodes by propagating information between the nodes. It should be noted that a node can include or can be associated with information (or data) to be propagated between the nodes of the image 102. The information (e.g., a label) can, for example, be used to effectively identify a node as having one or more characteristics (e.g., a node can be effectively identified by a label as a boundary node). Referring to the exemplary input image 102*a*, a node A (102*a*1) can include information that can be propagated to other nodes. As a result of the image processing performed by the IPS 100, the information of node A (102*a*1) can be propagated to nodes B and C (104*b* and 104*c*) as shown by the output image 104.

To further elaborate, FIG. 2A depicts a portion of an exemplary two-dimensional (2D) graph 200 suitable for processing by the IPS 100 in accordance with one embodiment of the invention. Graph 200 can, for example, be representative of the input image 102*a* depicted in FIG. 1. Referring to FIG. 2A, twenty five (25) nodes numbered from one (1) to twenty five (25) are depicted. It should be noted that in the exemplary two-dimensional (2D) graph 200, only nodes seven (7) and nineteen (19) have information. However, this information may effectively be propagated from node seven (7) to nodes numbered as nodes: one (1), three (3), four (4), five (5), six (6) and thirteen (13) when the graph 200 is processed. Similarly, the information of node nineteen (19) may be effectively propagated to nodes numbered as nodes: thirteen (13), eighteen (18), twenty (20), twenty four (24) and twenty five (25). It should be noted that the edges of graph 200 can, for example, be defined based on rules and/or conditions 106 (shown in FIG. 1).

Figure 2B:
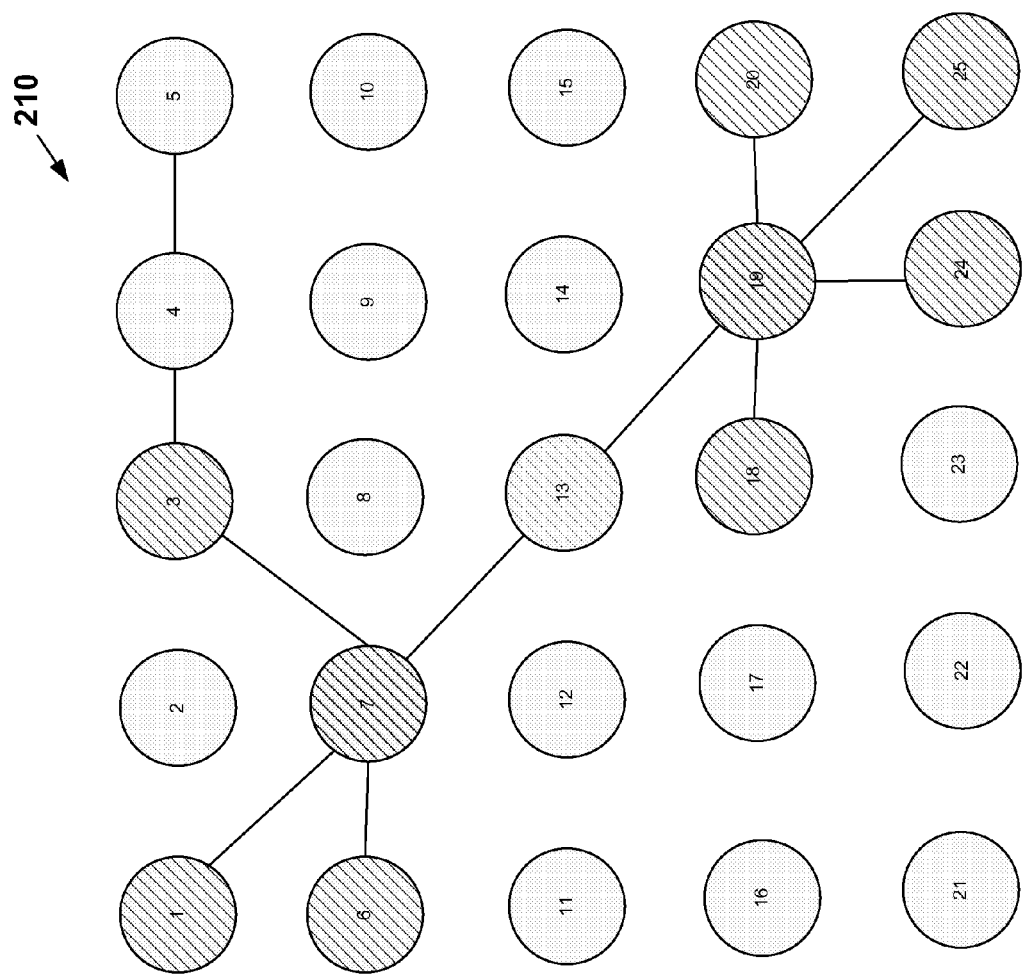
FIG. 2B depicts a graph representative of output of a first processing stage (or first iteration) of image processing that can be performed by an IPS in accordance with one embodiment of the invention.

As noted above, the graph 200 can represent an input image processed by the IPS 100 (shown in FIG. 1). FIG. 2B depicts a graph 210 representative of output of a first processing stage (or first iteration) of image processing that can be performed by the IPS 100 in accordance with one embodiment of the invention. More specifically, when processing the graph 200 (shown in FIG. 2A), the IPS 100 can determine for each node of the graph 200 (node one (1) to node twenty five (25)) whether to update information of the node by propagating information from its neighboring nodes.

Referring to FIG. 2B, conceptually, each one of the nodes one (1) to node twenty five (25) can independently determine whether they have one or more neighboring node with information. As such, in effect, nodes: one (1), three (3), four (4), five (5), six (6) and thirteen (13) can each separately and independently determine that they have a neighboring node, namely node seven (7), with information that can be propagated to them, and separately and independently propagate the information from seven (7) to themselves. Similarly, nodes thirteen (13), eighteen (18), twenty (20), twenty four (24) and twenty five (25) can independently and separately propagate the information of node nineteen (19) to themselves. It should be noted that in stark contrast to conventional techniques that would effectively propagate information from the perspective of nodes seven (7) and thirteen (13), which are often referred to as "source" nodes, the IPS 100 can effectively propagate information from the perspective of each and every node. As a result, a node, such as, for example, node eight (8) could also check for a neighboring node even though the node would not or could not propagate information in accordance with applicable rules (e.g., node eight (8) is not "connected" to another node in the graph 210, so information cannot be propagated to it).

However, it will be appreciated that operations performed for each node can be performed in parallel or effectively at the same time. In other words, for graph 210, twenty five (25) separate operations, one for each node, can be performed in parallel. Conceptually, this means that each node of the graph 210 can determine in parallel with the other nodes of the graph 210 whether the node has a neighboring node and/or propagate the information to the neighboring node if the node determines that it has a neighboring node.

It should be noted that each node of the graph 210 can effectively continue to check whether to propagate information from a neighboring node, so long as information has been propagated by at least one node in a previous stage or iteration. To further elaborate, FIG. 2C depicts a second stage or iteration of the processing that can be performed by the IPS 100 in accordance with one embodiment of the invention.

Figure 2C:
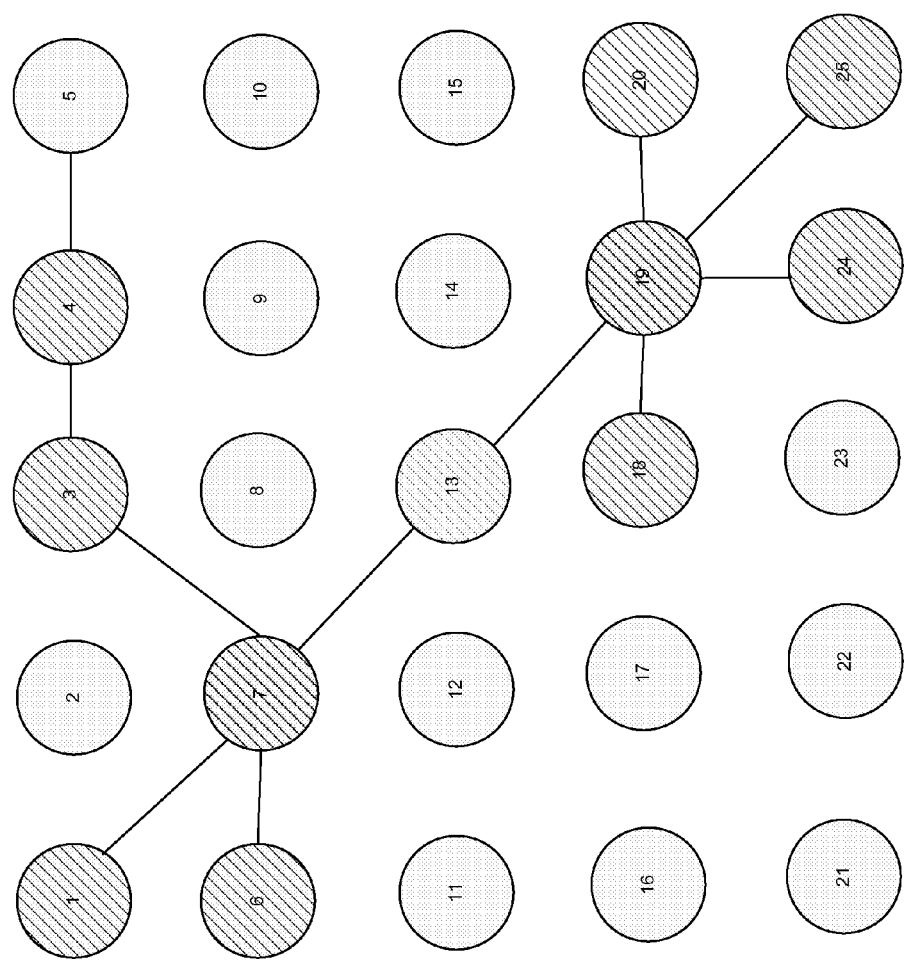
FIG. 2C depicts a second stage (or iteration) of the processing that can be performed by an IPS in accordance with the one embodiment of the invention.

Referring to FIG. 2C, at the second stage or iteration of the process, node four (4) effectively propagates the information from three (3). It should be noted that the information was previously propagated by node three (3) from node seven (7) in the first stage or iteration of the processing depicted in FIG. 2B. It should be noted that in the first stage or iteration of the processing (shown in FIG. 2B), node four (4) does not propagate any information from node three (3), but the processing continues or iterates to the second stage where node four (4) can determine that it has a neighboring node with information, namely, node three (3), and can propagate the information from the node three (3) to itself. It should be noted that rules and/or conditions 106 (shown in FIG. 1) can, for example, be used to not allow updating of node seven (7) from nodes one (1), six (6) and thirteen (13).

Figure 2D:
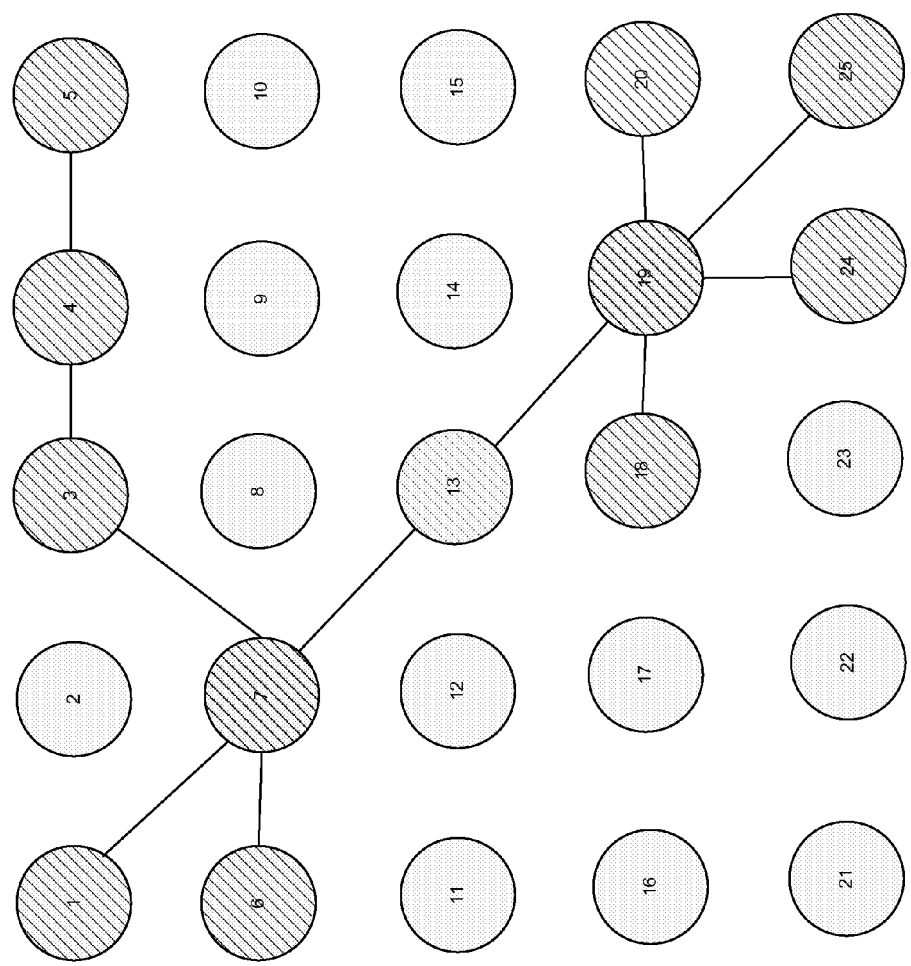
FIG. 2D depicts a third stage of the processing that can be performed by an IPS in accordance with one embodiment of the invention.

Similarly, in a third stage or iteration of the process, node five (5) can effectively propagate the information from node four (4) after node four (4) obtains the information from node there (3), and so on. FIG. 2D depicts a third stage or iteration of the processing that can be performed by the IPS 100 in accordance with one embodiment of the invention. This processing can continue until it is determined that in the previous stage or iteration, no node has propagated information. As such, after a fourth iteration of the process, no information can be propagated by any one of the nodes, and the processing can complete. Those skilled in the art will readily know that the determination of whether any one of the nodes has been updated can, for example, be made by using a global variable. In addition, the status of nodes for at least two stages or interactions of the process (e.g., current and previous iterations) can be stored. Moreover, those skilled in the art will appreciate that the IPS 100 can conceptually use a "structured grid" or "structured grids computations" for processing an image. In particular, the "structured grid" is highly suitable for implementing various Breadth First Search (BFS) graph traversal algorithms.

Figure 3:
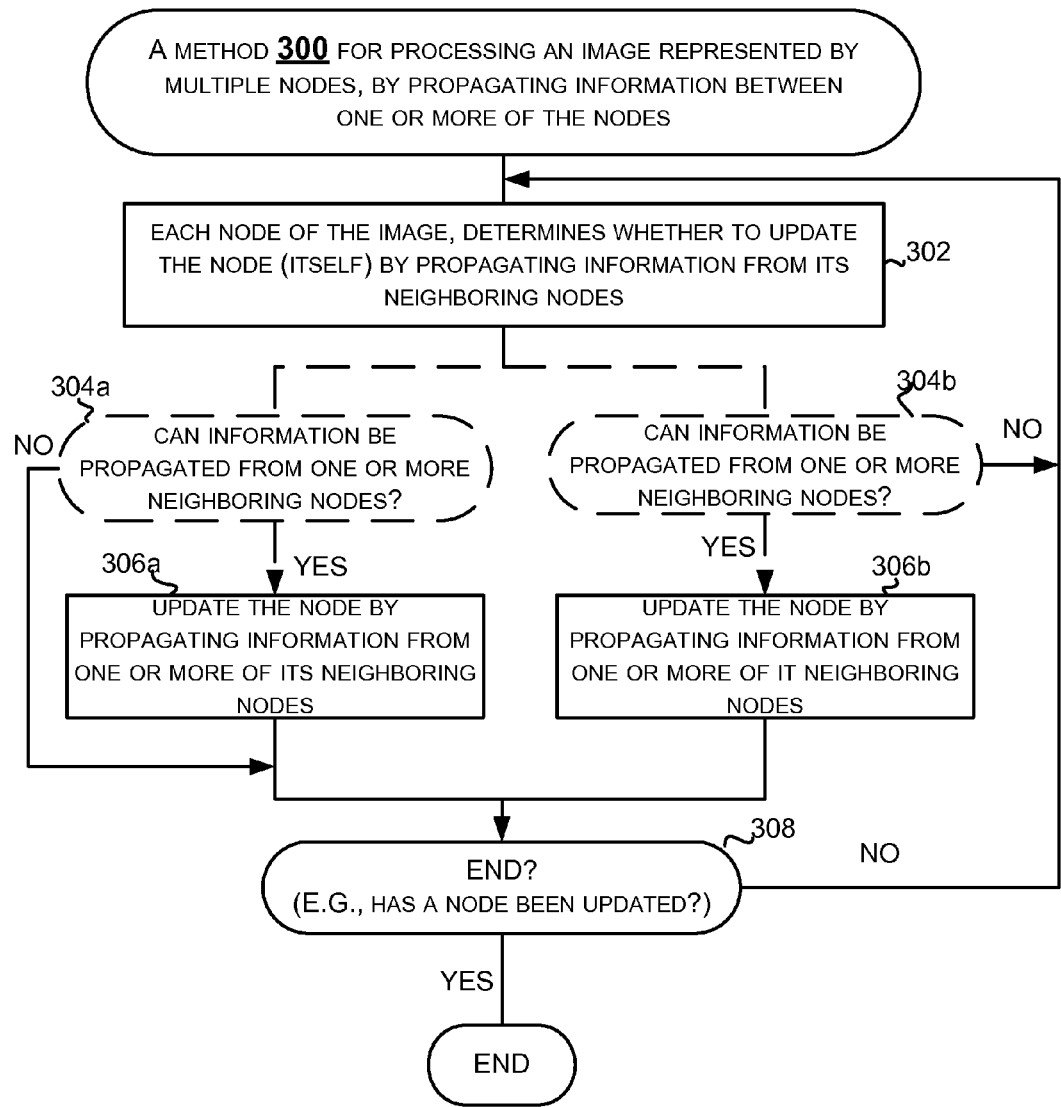
FIG. 3 depicts a method for processing an image represented by multiple nodes, by propagating information between one or more of nodes of an image in accordance with one embodiment of the invention.

FIG. 3 depicts a method 300 for processing an image represented by multiple nodes, by propagating information between one or more of the nodes of the image in accordance with one embodiment of the invention. Method 300 can, for example, be performed by the IPS 100 depicted in FIG. 1.

Referring to FIG. 3, initially, each node of the image determines (302) whether to update itself (or the information associated with the node) by propagating information from its neighbors (or neighboring nodes). It should be noted that each node can make this determination (or this determination can be made on behalf of each node) independently and separately from the other nodes (or determinations made on behalf of other nodes). Moreover, each node can make this determination in parallel, or substantially or effectively simultaneously with or at the same time, as the other nodes. As such, multiple determinations or decisions can be made separately and independently, as suggested by 304*a* and 304*b* depicted in FIG. 3 and depending on the outcome of the determining or decisions 304*a* and 304*b*, each node can update itself (or its information) separately and independently from the other nodes, by propagating information from it neighboring nodes, as shown by operations 306*a* and 306*b*. It should be noted that operations 306*a* and 306*b* can be made in parallel, or substantially or effectively simultaneously with or at the same time as the other nodes. Thereafter, it can be determined (308) to end the processing of the image. Generally, this determination (308) can be made based on one or more criteria depending, for example, on whether the nodes are updated synchronously or asynchronously. If the nodes are updated asynchronously, this determination (308) can be made on various criteria by the nodes. If the updated synchronously, the determination (308) can, for example, be made based on whether any node has been updated by each node independently and separately from other nodes (e.g., by checking a global variable that can be set by any node after it updates itself by propagating information from the neighboring nodes). Alternatively, this determination (308) can be made once. In any case, if it is determined (308) not to end processing of the image, method 300 proceeds to determine (302), for each node, whether to update the node by propagating information from one or more of the node neighbors (or the node's neighboring nodes). Method 300 can continue in a similar manner as discussed above until it is determined (308) to end processing of the image. It should be noted that if information can be propagated from multiple neighboring nodes, then an order of propagation can be determined and information can be propagated in accordance with the determined order. Generally, information from multiple neighboring nodes can be propagated in any way deemed appropriate (e.g., propagating based on an order, propagating from one or more selected neighbors and ignoring information from one or more other neighbors).

As noted above, method 300 (depicted in FIG. 3) is especially suited for parallel processing applications. More particularly, at each iteration or stage of the image processing, operations for each node of an image can be processed in parallel in accordance with the invention. To elaborate even further, FIG. 4A depicts a number of nodes being processed in parallel by multiple processors and/or processing cores 400 in accordance with one embodiment of the invention. Nodes 402 can, for example, represent the nodes of an image being processed by the method 300 depicted in FIG. 3. Referring to FIG. 4A, at an iteration of an image processing method, operations associated with each node 402 of the image can be performed by a processor or a processing core 400 in parallel. As such, at a given iteration or stage of image processing, operations associated with node 402A can be executed on a processor or processing core 400A in parallel with operations associated with another node 402B executed on another processor or processing core 400B, and so on. This means that at a given iteration or stage of processing an image represented by a number of (N) nodes, the same number (N) of processors or processing cores can be used to effectively execute operations associated with all of the N nodes of the graph in parallel with each other.

Figure 4B:
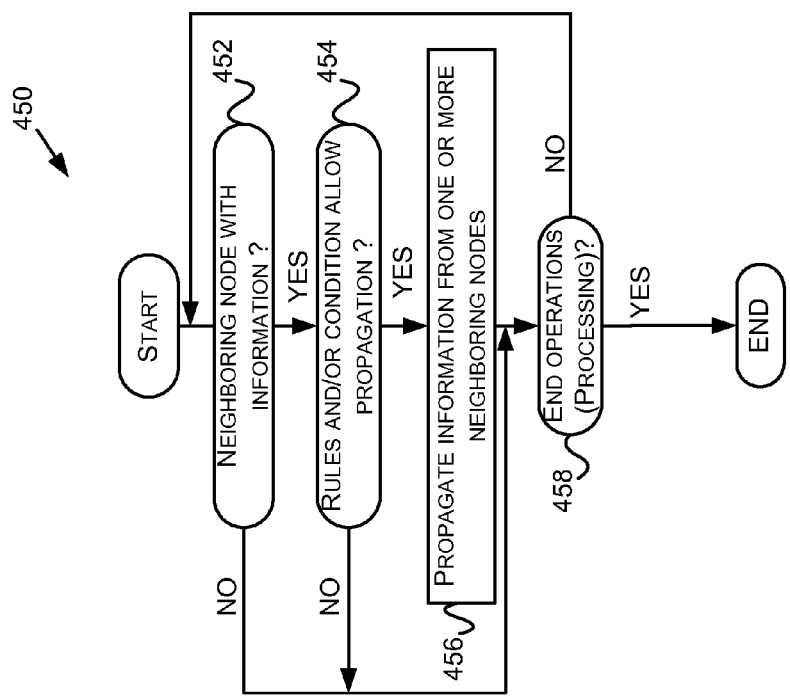
FIGS. 4A and 4B depict exemplary operations that can be performed in parallel for nodes of an image in accordance with one embodiment of the invention.
Figure 4A:
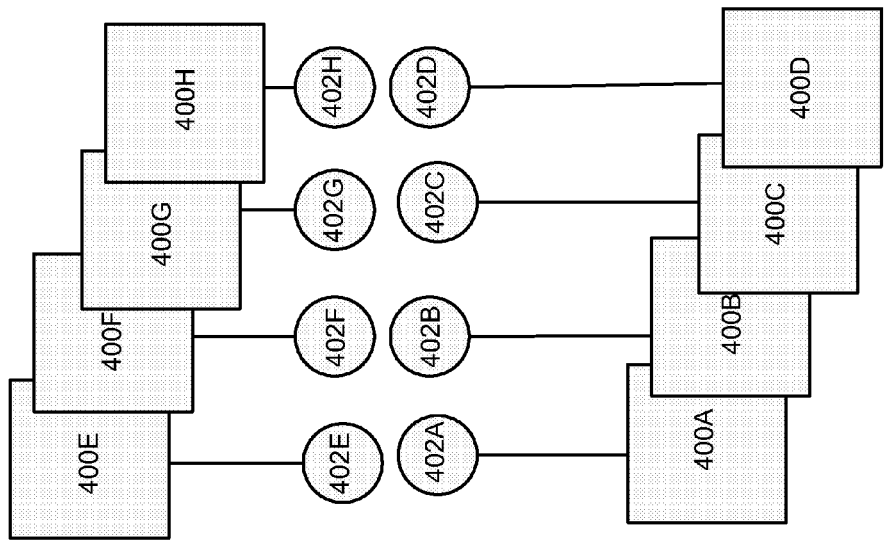

FIG. 4B depicts exemplary operations 450 that can be performed in parallel for nodes of an image in accordance with one embodiment of the invention. By way of example, operations 450 can be performed in parallel by each one of the nodes 452 depicted in FIG. 4B. Conceptually, operations 450 can be performed by a node or from the perspective of a node. Referring to FIG. 4B, initially, a node can determine (452) whether it has a neighboring node. If the node determines (452) that it does not have a neighboring node, the node need not perform any additional operation or the operations 450 can end. On the other hand, if the node determines (452) that it has at least one neighboring node with information, the node can determine (454) whether one or more rules and/or conditions allow propagation of the information from the one or more neighboring nodes. If the node determines (454) not to propagate the information, the node need not perform any additional operation or the operations 450 can end. Otherwise, the node can propagate (456) information from one or more of the nodes with information. It should be noted that a node can generally determine (458) whether to end its operations (or processing) and the operations 450 can end accordingly. As noted above, this determination (458) can, for example, be made based on a global variable indicative of no change in any of nodes.

Figure 4C:
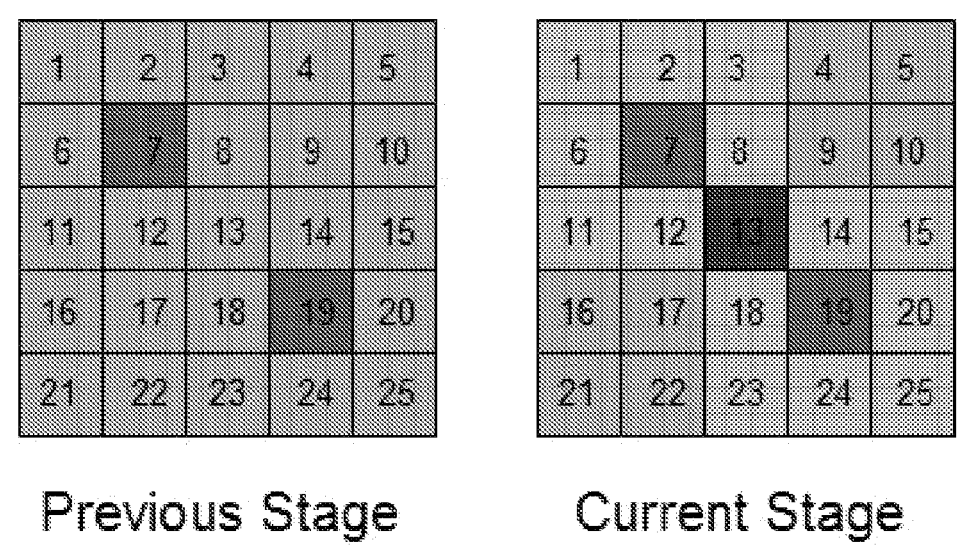

It will be appreciated that the invention can be utilized for parallelizing graph traversal on images by using structured grids for simulating the propagation behavior of graph traversal. In a conventional graph traversal algorithm, source nodes actively propagate information to their nearby neighbors. In contrast, in a structured grids computation (or computational model), the source nodes become passive and each node can check whether information can be propagated to it by some sources. In essence, the computation is reversed. Referring to FIG. 4C, grids 7 and 19 are source nodes that would transfer information to their neighboring pixels. In conventional graph traversal algorithms, grid 7 would transfer information to grids 1, 2, 3, 6, 8, 11, 12, and 13, and grid 19 would transfer information to grids 13, 14, 15, 18, 20, 23, 24, and 25. Even though grid 7 and grid 19 can propagate information to their nearby neighbors in parallel, there are still 8 serial propagation computations for each source node. In comparison, in a structured grids computation, all the 25 grids can check their nearby neighbors to see whether they can be updated by their neighbors. As such, one propagation computation is enough for updating the status of all the grids. A structured grid can be used for a BFS graph traversal.

A structured grids computation for simulating the behavior of BFS graph traversal is summarized below. It should be noted that Variable "i" is a counter for the structured grids iterations. $P_0, P_1, \ldots P_j, \ldots$ are the propagation results after iteration i. Initially, $P_0$ is set to S. That is, information is only stored on the pixels which are in the source nodes set S. The information on all other pixels is empty. In lines 3 to 9 the status of each pixel by structured grids computations can be iteratively updated. It should be noted that the variable "changed" is a global variable that can be accessed by all processors. If there is any change in any pixel, the global variable "changed" will be set as true. Otherwise, it will remain as false. There is no need to know which particular pixel has been updated. It is enough to know whether any pixel has been updated. As such, there is no need for synchronization or locking for setting the global variable "changed." On line 6, the computation of updating the status of each pixel can be distributed to all the available processors. Because the computation on each pixel can be the same and independent, the processing work can be evenly distributed to all available processors. If no pixel has changed, then the structured grids computation will stop on line 9, and the latest results are returned on line 10.

```
Input:    I      // The input image.
          S      // Initial set of source nodes, from which information
                 can be propagated.
          R      // Rules specifying whether the information can be
                 propagated from a pixel to another pixel.
          N      // The definition of neighbors of a pixel.
Output:   P      // Final image with proper information stored in each
                 pixel
Structured_Grids_Propagation (I, S, R, N)
1. i ← 0;
2. P_0 ← S;
3. while (true)
4.      i ← i + 1;
5.      changed ← false;
6.      for each pixel p in I
7.          P_i←Check_Update(p, I, P_{i-1}, R, N, changed);
8.      if (changed == false)
9.          break;
10. return P_j;
```

The Check_Update subroutine shown below provides exemplary computations that can be done in each pixel, during each structured grids computation. All processors can use this subroutine for updating the status on each pixel in parallel. In lines 1 to 5, the subroutine verifies whether there is any information that can be propagated to pixel p from its neighbors N(p). On line 3, the propagation of information is valid, if and only if the neighbor pixel q and p satisfy the propagation rule R(q, p) and the information in q is not empty. On lines 6 through 8, if there needs to be multiple information propagations to p, the order of information propagation can first be decided, and the propagation can then be performed according to the order we have specified. No race condition will occur here, since we can decide the propagation order before doing the propagation. On lines 9 and 10, if there is only one neighbor that can propagate information to p, then that is immediately done. On lines 11 and line 12, we check the status of pixel p. If the status of p has changed, then we set the global variable "changed" to true.

```
Check_Update (p, I, P_{i-1}, R, N, changed)
1. valid_num ← 0;
2. for q in N(p)
3.      if ((R(q, p) == true) AND (information(P_{i-1}, q) != empty))
4.          valid(q) ← true;
5.          valid_num ← valid_num + 1;
6. if (valid_num > 1)
7.      order ← Decide_Propagation_Order(valid, p, I, P_{i-1}, R, N);
8.      Propagate_Multiple_Information(order, p, I, P_{i-1}, R, N);
9. if (valid_num == 1)
10.     Propagate_Single_Information(valid, p, I, P_{i-1}, R, N);
11. if (Information(p) != Information(P_{i-1}, p))
12.     changed ← true;
```

In comparison to conventional parallel BFS graph traversal algorithms, several advantages can be realized by applying structured grids for simulating graph traversal behavior. One such advantage is a relatively larger degree of parallelism. For existing parallel BFS graph traversal algorithms, the computation on source nodes can be done in parallel. However, in a structured grids computation, all the nodes connecting to the source nodes can be updated in parallel. In general, the number of source nodes is much smaller than the number of nodes they are connected to. Therefore, the structured grids computation can express larger parallelism. Referring to FIG. 4C, as an example, if grids 7 and 19 can propagate information in parallel, it achieves 2-way parallelism. For the structured grids computation, grids 1, 2, 3, 6, 8, 11, 12, 13, 14, 15, 18, 20, 23, 24, and 25 can update their status in parallel. It is 15-way parallelism. Larger than the naïve 2-way parallelism method.

Another advantage of applying structured grids for simulating graph traversal behavior is better scalability and load balancing. For graph traversal algorithms, usually it is not known in advance how much computation is required for each one of the different source nodes in order to propagate information. Therefore, it is hard to balance work loads for different processors. Conventional distributed graphs have a hard time defining balanced graph partitions. The task queue approaches can have a better balancing performance. However, the task collection and redistribution can be expensive. For the structured grids, the computations on all grids can all be the same. As such, the work load can be more easily balanced. Moreover, if more processors are available, more grids can be updated in parallel. So, the scalability is linear to the number of processors.

Yet another advantage of the invention is that "race conditions" can be eliminated. If several source nodes are propagating information to the same grid, the update ordering of the grid is generally non-deterministic, so race conditions can occur and must be accounted for. However, for structured grids calculations, before a grid updates itself, it can check all its neighbors that can transfer information to it, and decide the access ordering by itself so no race conditions will occur. Referring back to FIG. 4C, for grid 13 in FIG. 4, it knows that both grid 7 and grid 19 are propagating information to it, so it can decide how to deal with the information from both sides.

The following discussion compares computational complexities of a serial graph traversal algorithm, an existing parallel graph traversal algorithm, and a structured grids approach. Assuming there are n source nodes, information from each source node will be propagated to $a_1, a_2, \ldots, a_n$ pixels, respectively. The computational complexity of serial algorithm is $$O\left(\sum_{i=1}^{n} a_i\right).$$

For an existing parallel graph traversal algorithm with p processors, because the work loading is hard to control, it is assumed that each processor take care of n/p source nodes. The computational complexity is $$O\left(\frac{n}{p}\max_{i}(a_i)\right),$$

and the upper bound of the number of processors is n. For the structured grids computation, let the number of grids (the number of pixels in the image) be m, and the maximum distance a source node i can propagate is $d_i$ the computational complexity is $$O\left(\frac{m}{p}\max_{i}(d_i)\right),$$

and now p can scale to m. Suppose we have m processors, then the performance for the parallel structured grids computation compared to the parallel graph traversal is $O(\max(a_i))$ against $O(\max(d_i))$. Usually $O(\max(a_i))=O((\max(d_i))^2)$, so the structured grids method has a large advantage over the parallel graph traversal method.

Label Propagation on a Finite Number of Layers

Referring back to FIG. 1, it will be appreciated that the IPS 100 can also be operable to process the input image 102 by propagating labels between one or more of the nodes. In this type of processing, each node of the image can be associated with a value (or a level), for example, a gray level (e.g., gray levels zero (0) to two hundred and fifty five (255) corresponding to a pixel). These values can, for example, be used for watershed boundary detection algorithms, as is generally known in the art. In addition, labels of a neighboring node can be propagated to an unlabeled node.

Figure 5A:
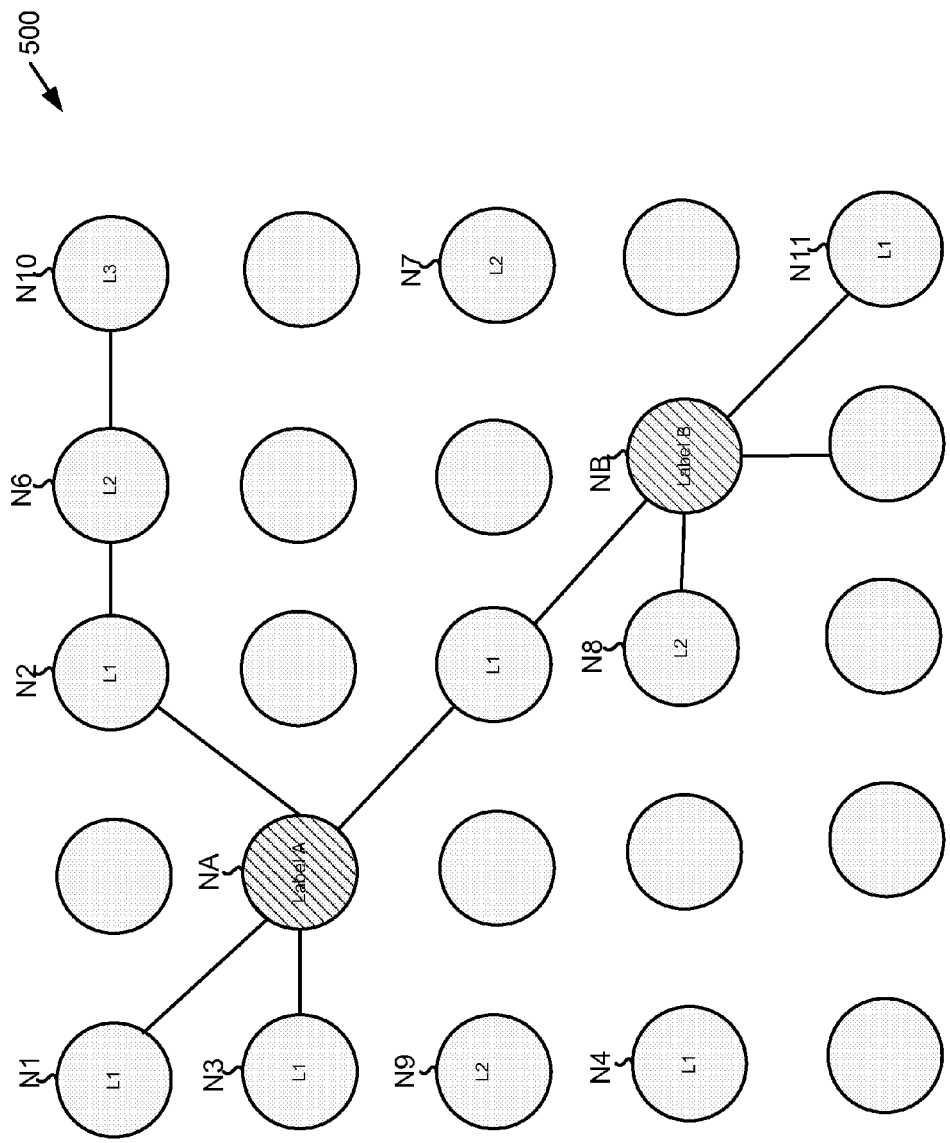
FIG. 5A depicts an input image that can be processed by an IPS in accordance with one embodiment of the invention.

To further elaborate, FIG. 5A depicts an input image 500 that can be processed by the IPS 100 in accordance with one embodiment of the invention. Referring to FIG. 5A, a portion of the input image 102 is represented as graph with multiple nodes of various values (e.g., levels). More particularly, nodes N1, N2, N3, N4 and N5 are depicted as value one (1) nodes, N6, N7, N8 and N9 are depicted as value two (2) nodes, and node N10 is depicted as a value three (3) node in FIG. 5A. It should be noted that in the input image 500, two nodes are initially labeled. Namely, node NA having or being labeled with a first label (Label A) and node NB having or being labeled with a second label (Label B). As such, nodes NA and NB can represent nodes that are initially chosen or received as input for processing. For example, nodes NA and NB can be the "local minimum" nodes of a watershed algorithm which is generally known in the art. It should be noted that the NA and NB can also have a value (e.g., a level). For example, "local minimum" nodes of a watershed algorithm typically have a low or a locally minimum value. As such, node NA and NB can, for example, be node of level zero (0) used by a conventional watershed algorithm to propagate labels to the other nodes.

In addition, a low and a high value (or level) can be provided as input to the process. A low value ("Low-Value") can, for example, correspond to the minimum value (e.g., minimum gray level) of any one of the nodes in the graph or the minimum value of the nodes NA and NB, as generally used for watershed algorithm that detect boundary nodes. Similarly, a high value ("High-value") can, for example, represent the maximum value (e.g., maximum gray level) of any one of the nodes in the graph. Generally, a finite range of values are considered.

Unlike conventional techniques which propagate the labels from nodes NA and NB to other nodes, it will be appreciated that IPS 100 (shown in FIG. 1) can effectively allow each of the nodes to propagate the labels to themselves. More specifically, at each iteration or stage of the process, unlabeled nodes of the same value (e.g., nodes in the same level) can independently and separately determine whether they can propagate a label from a neighboring node. For example, referring to FIG. 5A, in one iteration or stage, each of the value one (1) nodes that are unlabeled, namely, nodes N1, N2, N3, N4 and N5 can independently and separately determine whether they have a neighboring labeled node. As a result, unlabeled value one (1) nodes N1, N2, N3 and N5 (but not node N4) can determine that they have a neighboring labeled node, namely node NA and may propagate label A from node NA depending on one or more rules and/or when one or more conditions have been met. Also, in the same iteration, value one (1) nodes N5 and N11 can determine that they have a neighboring labeled node, namely node NB, and may propagate label A from node NA depending on one or more rules and/or when one or more conditions have been met. In particular, propagation of label A and/or label B by node N5 may depend on the particular algorithm used as, for example, various watershed algorithms may assign multiple labels to a node when multiple labels can be propagated to the node, or randomly propagate one of multiple labels. Generally, a node can be marked as a boundary node when two different labels can be propagated to the node.

Figure 5B:
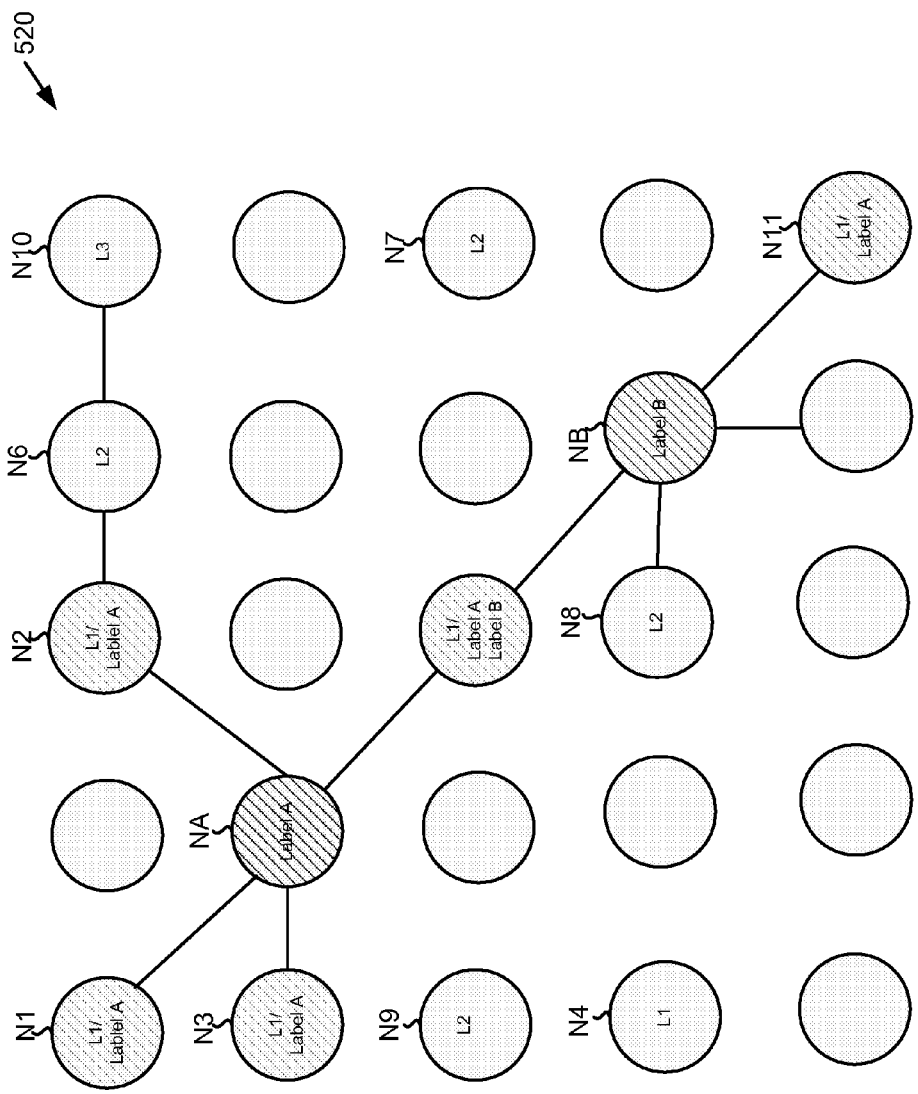
FIG. 5B depicts an exemplary resulting graph after completion of an iteration of a process for nodes of level one (1) in accordance with one exemplary embodiment of the invention.

FIG. 5B depicts an exemplary resulting graph 520 after completion of a stage of the process for nodes of level 1 in accordance with one exemplary embodiment of the invention. Referring to FIG. 5B, all value one (1) nodes have propagated labels from their neighboring node. In this exemplary embodiment, node N5 has propagated both labels A and B and may be marked as boundary node.

Figure 5C:
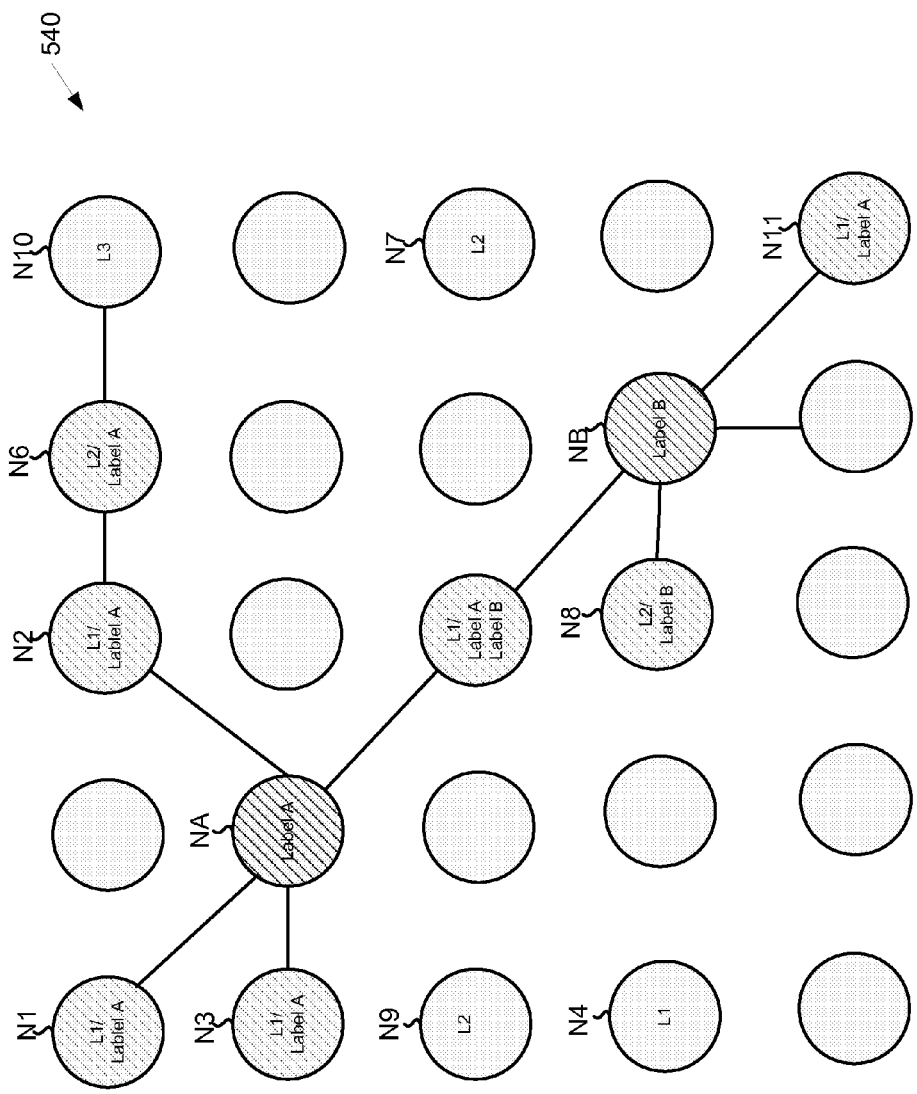
FIG. 5C depicts an exemplary resulting graph after completion of an iteration of a process for nodes of level two (2) in accordance with one exemplary embodiment of the invention.

At any rate, following the processing performed for or effectively by nodes of level one, the processing performed by IPS 100 generally moves to a next iteration or stage where nodes of a next value (or Next-Value nodes) perform similar processing as that performed by the nodes of a previous value in a previous iteration or stage. By way of example, after processing of nodes of value one (1), nodes of value two (2) can be processed in the next iteration. Referring back to FIG. 5B, each one of the unlabeled nodes of level two (2), namely, nodes N6, N8 and N9 can independently and separately determine if there is a labeled neighboring node and can propagate a label accordingly. FIG. 5C depicts an exemplary resulting graph 540 after completion of an iteration or a stage of the process for nodes of level 2 in accordance with one exemplary embodiment of the invention.

IPS 100 can process the nodes and propagate labels iteratively for next level nodes (e.g., nodes of level there (3)) until the High-value is reached. In other words, the IPS 100 can be operable to iteratively process nodes between a Low-Value and a High-Value. Again, it should be noted that a Low-Value and a High-Value can be received as input and can, for example, be minimum and a maximum values used for a watershed algorithm.

Figure 6:
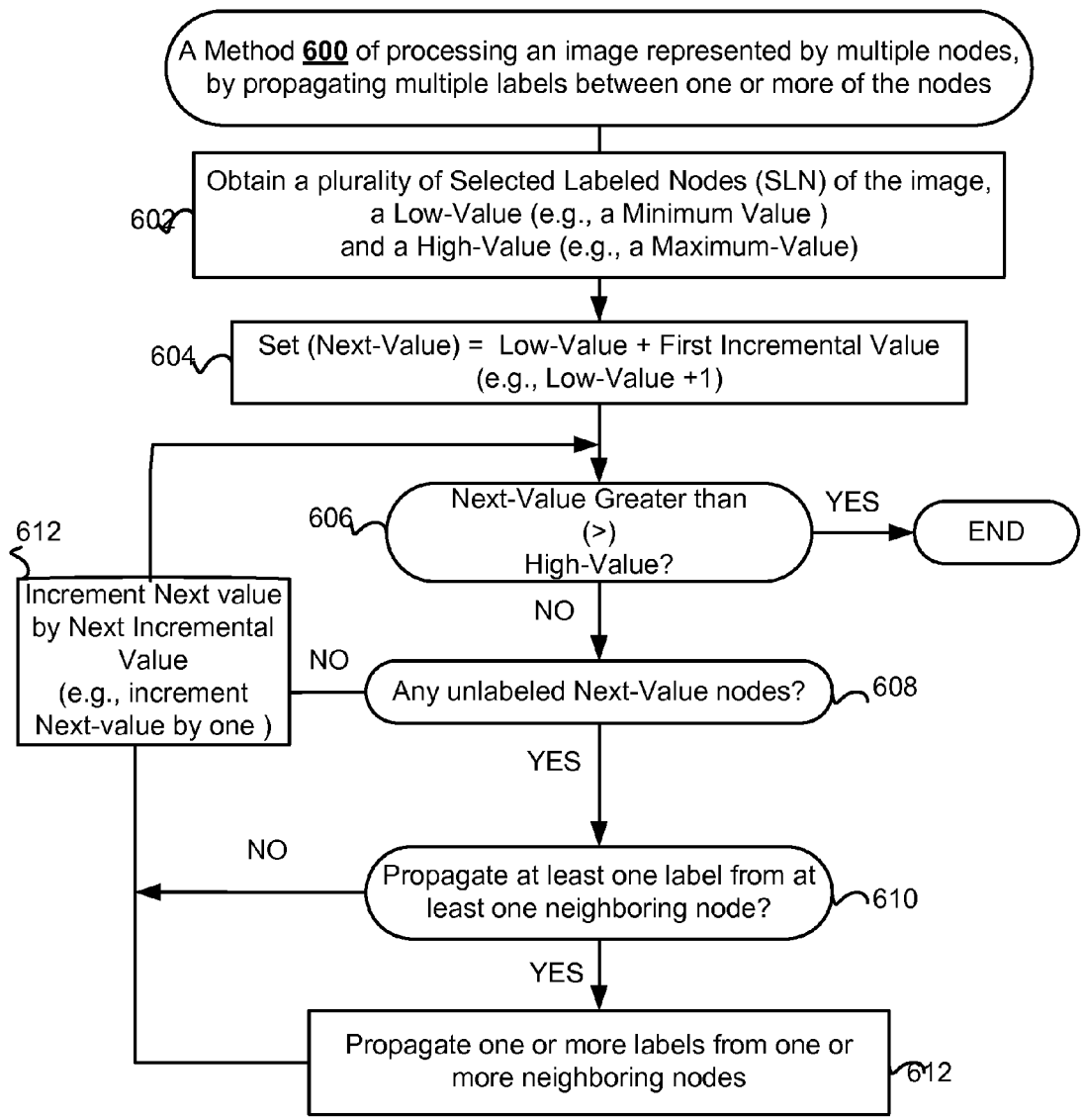
FIG. 6 depicts a method for processing an image represented by multiple nodes, by propagating multiple labels between one or more of the nodes in accordance with one embodiment of the invention.

To further elaborate, FIG. 6 depicts a method 600 for processing an image represented by multiple nodes, by propagating multiple labels between one or more of the nodes in accordance with one embodiment of the invention. Method 600 can, for example, be used be the IPS 100 to process the input image 102 (shown in FIG. 1). Referring to FIG. 6, initially, data is obtained (602). The data is representative of a plurality of Selected Labeled Nodes (SLN) of the image (e.g., local minimums), a Low-Value (e.g., a Minimum Value, such as, the minimum gray level of the image or the local minimum nodes) and a High-Value (e.g., a Maximum-Value, such as, the maximum gray level of the image). Next, a Next-Value is determined (604) by incrementing the Low-Value by a first incremental value. Generally, the first incremental value can be a positive number (e.g., a positive integer) or Zero (0). In other words, the Next-Value can be determined (604) to be more than or the same as the Maximum-Value. However, typically, for watershed algorithms the incremental value can be chosen as a positive integer (e.g., integer 1). In addition, it should be noted that conventional approaches generally use a priority queue to identify the node with minimum level. However, IPS 100 can be operable to go through a range of values, from a low value to a high value, without having to use a priority queue.

In any case, after determining the Next-Value based on a first incremental value, it is determined (606) whether the Next-Value is greater than the High-Value. If it is determined (606) that the Next-Value is not greater than the High-Value, the method 600 proceeds to determine (608) whether there are any unlabeled nodes with the Next-Value (or Next-Value nodes). Thereafter, each unlabeled Next-Value node can determine (608) whether to propagate at least one label from at least one neighboring node. As a result, each one of the unlabeled Next-Value nodes may propagate (610) one or more labels from one or more neighboring nodes. It should be noted that each one of the determinations 606, determinations 608, and propagations 610 can be performed independently and separately for each one of the Next-Value nodes. Moreover, each one of the Next-Value nodes can perform one or more of the determinations 606, determinations 608, and propagations 610 in parallel, effectively at the same time or simultaneously with another one of the Next-Value nodes. As such, method 600 is especially suited for parallel processing applications.

Referring to FIG. 6, it should be noted that after processing of the Next-Value nodes in the first iteration of the process 600, the Next Value is incremented by a next incremental value. Generally, the next incremental value can be different than the first incremental value and can vary between iterations. However, for watershed algorithms the same incremental value (e.g., integer one) can be used to effectively iterate between gray levels one (1) to two hundred and twenty five (255). By way of example, for a watershed algorithm, 255 gray levels can be iteratively processed, one by one, starting at gray level one (1), continuing to gray level two (2), and then gray level three (3), and so on until the last gray level, namely gray level 255 is reached. In effect, method 600 continues to iteratively process nodes of the Next-Value until it is determined that the Next-Value would exceed the High-Value. As such, method 600 can iteratively process nodes with values between the Low-Value and High-Value before it completes processing the input image. It should be noted that if multiple labels can be propagated, an order of propagation can be determined and multiple labels can be propagated in accordance with the determined order.

As noted above, method 600 is especially suited for parallel processing applications. More particularly, at each iteration performed for the nodes of the same level (e.g., nodes that have the same gray-level) operations pertaining to propagation of labels can effectively be performed by each node in parallel with other nodes. To elaborate even further, FIG. 7A depicts a number of nodes of the same level being processed in parallel by multiple processors and/or processing cores 700 at different iterations (or stages) 702 of an image processing method, in accordance with one embodiment of the invention. The processing method can, for example, be method 600 as depicted in FIG. 6.

Referring to FIG. 7A, at an iteration I (702A), conceptually, each one of the nodes of level I (704A, 704B, 704C and 704D) can, in parallel, perform operations pertaining to propagation of labels by respectively using one of the processors and/or processing cores 700A, 700B, 700C and 700D. Similarly, at a next iteration 702B (or iteration I+1), each one of the nodes of level I+1 (706A, 706B, 706C and 706D) can, in parallel, perform operations pertaining to propagation of labels by respectively using one of the processors and/or processing cores 700A, 700B, 700C and 700D. As such, at each iteration, for a total number of nodes (N) being processed for that iteration, the same number (N) of processors and/or processing cores 700 can operate in parallel to compute computations pertaining to propagation of labels for the nodes.

Figure 7B:
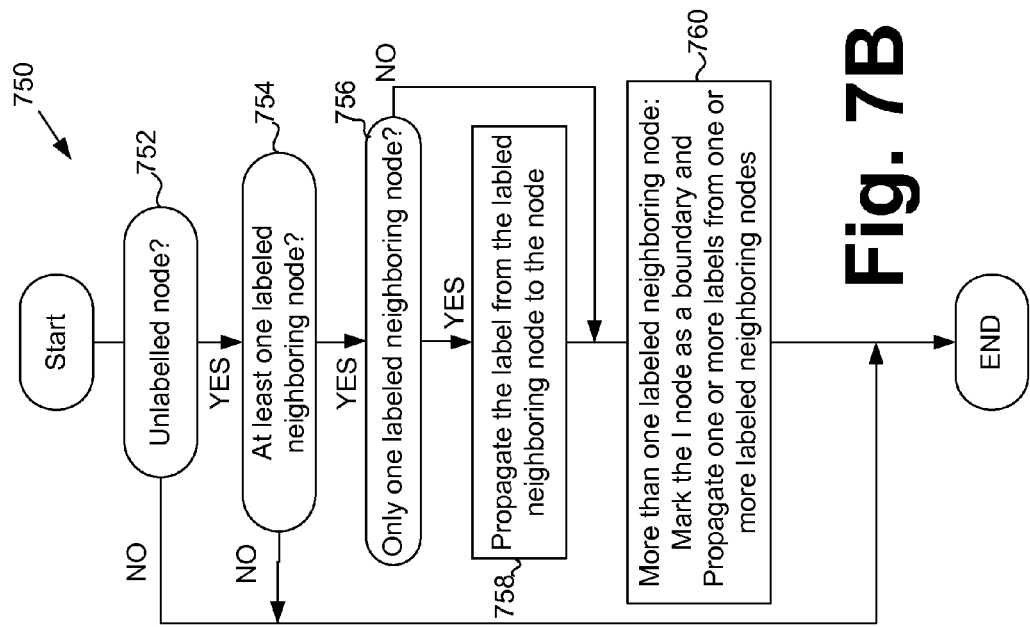
FIG. 7B depicts an exemplary set of operations that can be performed for nodes of the same level in parallel with other nodes of the same level in accordance with one embodiment of the invention.
Figure 7A:
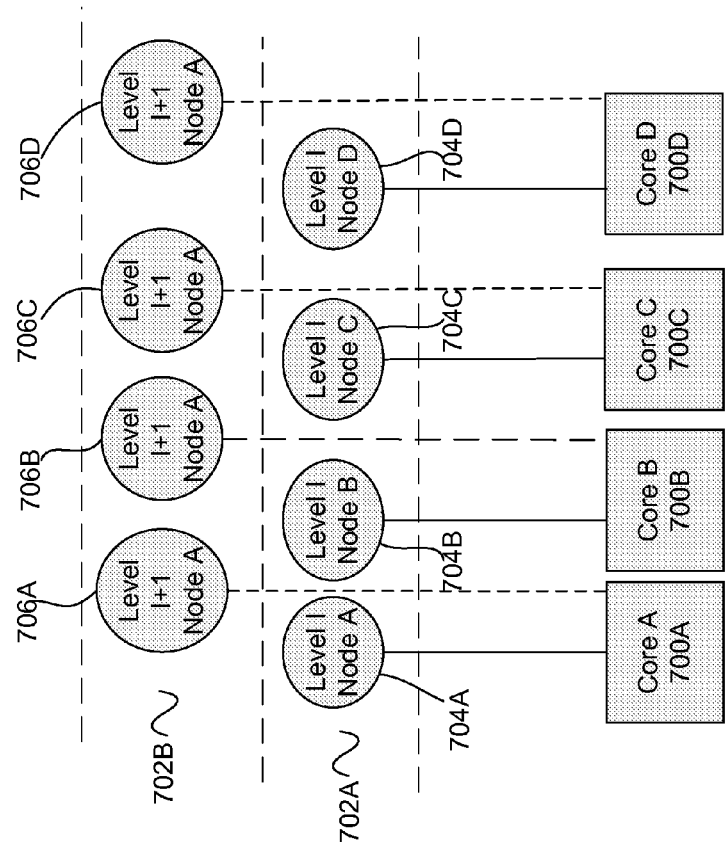
FIG. 7A depicts a number of nodes of the same level being processed in parallel by multiple processors and/or processing cores at different iterations (or stages) of an image processing method in accordance with one embodiment of the invention.

FIG. 7B depicts an exemplary set of operations 750 that can be performed for nodes of the same level in parallel with other nodes of the same level, in accordance with one embodiment of the invention. By way of example, operations 750 can be performed for the nodes 704 and/or nodes 706 as depicted in FIG. 7A. It will be appreciated that the exemplary operations 750 are especially suited for a watershed algorithm designed to detect boundary nodes in a graph representative of an image. Conceptually, operations 750 can be performed by a node or from the perspective of a node. Referring to FIG. 7B, initially, a node can determine (752) whether the node is an unlabeled node. If the node determines (752) that it is a labeled node (or the node has been labeled), the node may not perform any operations or the operations 750 end. However, if the node determines (752) that it is an unlabeled node, the node determines (754) whether the node has at least one labeled neighboring node. If the node determines (754) that it does not have any labeled neighboring nodes, the node may not perform any operations or the operations 750 end. On the other hand, if the node determines (754) that it has at least one labeled neighboring node, the node determines (756) whether it has more than one (1) labeled neighboring node. As such, the node propagates (758) the label of a neighboring label node, if it is determined (756) that it has only one labeled neighboring node. However, if the node determines (754) that it has more than one labeled neighboring node, typically, the node can be marked as a boundary node and/or the node can propagate one or more of labels from its multiple neighboring nodes (760). As will be appreciated by those skilled in the art, the action taken can depend on the specific watershed algorithm being used. The operations 750 end after propagation of a label from one neighboring labeled node (758) or one or more labels selected from multiple neighboring nodes (760).

In view of the foregoing, those skilled in the art will appreciate that a parallel Ultrametric Contour Map (UCM) region extraction system can be developed based on parallel structured grids for the BFS traversal algorithm. Image local minimums are extracted according to the BFS graph traversal algorithm. Different labels are assigned and propagated to each local minimum. For the watershed algorithm, the 255 gray scales can be scanned for simulating the flooding behavior. When simulating the flooding behavior in one gray scale, the BFS traversal algorithm can be used for propagating labels from different catchment basins. In order to extract edges from watershed boundaries, the BFS graph traversal can be used for finding paths that connect the nodes together. Edge linearization can also be achieved by traversing along the extracted edges. Most of the computations for the UCM region extraction are BFS graph traversal. As such, by proposing the parallel structured grids for the BFS graph traversal algorithm, the UCM region extraction can be done in parallel. It will also be appreciated that structured grids computations can be mapped to a Parallel Platform, for example, by mounting the computation of each grid to a processing unit, dividing a grid and mapping the computation of each part of the grid to a processing unit, etc. For distributed systems, "ghost" grids, "double buffering," or "multi-grid" solutions can be applied.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. In a computing system, a computer-implemented method of parallel processing an image comprising a plurality of pixel nodes, wherein each of said plurality of pixel nodes is associated with a pixel value, and wherein at least one pixel node of said plurality of pixel nodes is labeled with one or more labels, the computer-implemented method comprising:

(a) obtaining multiple labeled pixel nodes from said plurality of pixel nodes, a first pixel value and a second pixel value;

(b) determining whether there is at least one unlabeled pixel node associated with a third pixel value, wherein the third pixel value is a succeeding value of the first pixel value;

(c) for each unlabeled pixel node associated with the third pixel value, determining if there is at least one neighboring labeled pixel node for said unlabeled pixel node;

(d) for each unlabeled pixel node associated with the third pixel value, propagating one or more labels from one or more neighboring labeled pixel nodes if said unlabeled pixel node has at least one neighboring labeled pixel node, wherein said unlabeled pixel node determines an order for propagating said one or more labels to said unlabeled pixel node; and (e) incrementing the third pixel value and repeating (b), (c) and (d) until the third pixel value reaches the second pixel value;

wherein at least one of (c) and (d) is performed in parallel for two or more unlabeled pixel nodes associated with the third pixel value.

2. The computer-implemented method of claim 1, wherein:
   at least two labeled pixel nodes are labeled with different labels;
   the pixel nodes are represented as a structured grid; and
   each unlabeled pixel node is configured to independently perform at least one of (c) and (d).

3. The computer-implemented method of claim 1, wherein the third pixel value is between the first pixel value and the second pixel value.

4. The computer-implemented method of claim 1, wherein:
   each pixel value is an integer value;
   the first pixel value is incremented by one to obtain the third pixel value; and
   the (e) increments the third pixel value by one.

5. The computer-implemented method of claim 1, wherein:
   the first pixel value is a minimum pixel value for said plurality of pixel nodes; and
   the second pixel value is a maximum pixel value for said plurality of pixel nodes.

6. The computer-implemented method of claim 5, wherein the minimum pixel value is the lowest pixel value associated with one or more labeled pixel nodes.

7. The computer-implemented method of claim 6, wherein one or more labeled pixel nodes represent local minimum pixel nodes associated with a watershed algorithm for identifying boundaries of the image.

8. The computer-implemented method of claim 5, wherein the minimum pixel value is the lowest pixel value associated with one or more of said plurality of pixel nodes.

9. The computer-implemented method of claim 1, wherein (b), (c) and/or (d) are performed in parallel, simultaneously and/or effectively at the same time for two or more unlabeled pixel nodes associated with the same pixel value.

10. The computer-implemented method of claim 1, wherein a first processor and/or processing core performs (b), (c) and/or (d) for a first unlabeled pixel node in parallel and/or effectively at the same time as a second processor and/or processing core that performs (b), (c) and/or (d) for a second unlabeled pixel node.

11. The computer-implemented method of claim 10, wherein the first and second processors and/or processing cores perform in parallel and/or effectively at same time without partitioning the image, wherein the first unlabeled pixel node is in a first portion of the image and the second unlabeled pixel node is in a second portion of the image.

12. The computer-implemented method of claim 1, wherein the computer-implemented method does not comprise partitioning the image into two or more image portions.

13. The computer-implemented method of claim 12, wherein the computer-implemented method does not comprise merging processing results of two or more image portions of the image.

14. The computer-implemented method of claim 1, wherein pixel values for said plurality of pixel nodes represent gray levels of said plurality of pixel nodes.

15. The computer-implemented method of claim 14, wherein:
said gray levels comprise two hundred and fifty-five gray levels including one level representing gray level zero and another level representing gray level two hundred and fifty-five.

16. The computer-implemented method of claim 1, wherein each label is for a watershed algorithm.

17. The computer-implemented method of claim 1, wherein the computer-implemented further comprises:
determining an order of propagation for two or more labels; and
propagating said two or more of the labels in accordance with the determined order.

18. A computing system operable to perform a computer-implemented method of processing an image comprising a plurality of pixel nodes, wherein each of said plurality of pixel nodes is associated with a pixel value, and wherein at least one pixel node of said plurality of pixel nodes is labeled with one or more labels, the computer-implemented method comprising:
(a) obtaining multiple labeled pixel nodes from said plurality of pixel nodes, a first pixel value and a second pixel value;
(b) determining whether there is at least one unlabeled pixel node associated with a third pixel value, wherein the third pixel value is a succeeding value of the first pixel value;
(c) for each unlabeled pixel node associated with the third pixel value, determining if there is at least one neighboring labeled pixel node for said unlabeled pixel node;
(d) for each unlabeled pixel node associated with the third pixel value, propagating one or more labels from one or more neighboring labeled pixel nodes if said unlabeled pixel node has at least one neighboring labeled pixel node, wherein said unlabeled pixel node determines an order for propagating said one or more labels to said unlabeled pixel node; and
(e) incrementing the third pixel value and repeating (b), (c) and (d) until the third pixel value reaches the second pixel value.

19. The computing system of claim 18, wherein:
at least one of (c) and (d) is performed in parallel for two or more unlabeled pixel nodes associated with the third pixel value; and
each unlabeled pixel node is configured to independently perform at least one of (c) and (d).

20. A non-transitory computer readable storage medium storing at least computer executable code that when executed causes a computer to perform computer-implemented method of processing an image comprising a plurality of pixel nodes, wherein each of said plurality of pixel nodes is associated with a pixel value, and wherein at least one pixel node of said plurality of pixel nodes is labeled with one or more labels, the computer-implemented method comprising:
(a) obtaining multiple labeled pixel nodes from said plurality of pixel nodes, a first pixel value and a second pixel value;
(b) determining whether there is at least one unlabeled pixel node associated with a third pixel value, wherein the third pixel value is a succeeding value of the first pixel value;
(c) for each unlabeled pixel node associated with the third pixel value, determining if there is at least one neighboring labeled pixel node for said unlabeled pixel node;
(d) for each unlabeled pixel node associated with the third pixel value, propagating one or more labels from one or more neighboring labeled pixel nodes if said unlabeled pixel node has at least one neighboring labeled pixel node, wherein said unlabeled pixel node determines an order for propagating said one or more labels to said unlabeled pixel node; and
(e) incrementing the third pixel value and repeating (b), (c) and (d) until the third pixel value reaches the second pixel value.

21. The non-transitory computer readable storage medium of claim 20, wherein:
at least one of (c) and (d) is performed in parallel for two or more unlabeled pixel nodes associated with the third pixel value; and
each unlabeled pixel node is configured to independently perform at least one of (c) and (d).

* * * * *